Figure 1:
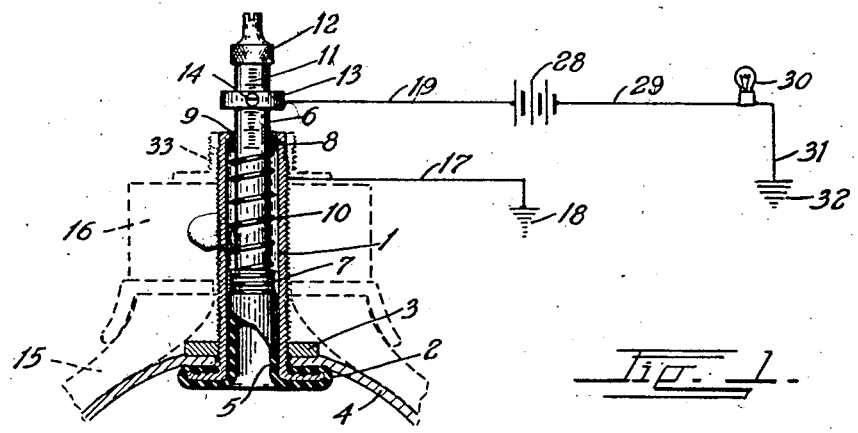

Aug. 29, 1933.   C. A. FRANK   1,924,921

INDICATING VALVE STEM AND LOW PRESSURE SIGNAL SWITCH

Filed Feb. 20, 1933

Inventor
Clarence A. Frank.
By A. J. O'Brien
Attorney

Patented Aug. 29, 1933

1,924,921

UNITED STATES PATENT OFFICE 1,924,921

INDICATING VALVE STEM AND LOW PRESSURE SIGNAL SWITCH

Clarence A. Frank, Edgewood Arsenal, Md.

Application February 20, 1933. Serial No. 657,498

5 Claims. (Cl. 260—58)

This invention relates to improvements in valve stems and has reference more particularly to a valve stem of the type employed with pneumatic tires.

It is well known that pneumatic tires of the type employed on automobiles often develop slow leaks and as a result of this, the pressure in the tire decreases very gradually and before the decrease in pressure is discovered by the driver, the tire casing has been greatly injured, due to the severe flexing that results when the pressure falls below normal.

It is the object of this invention to produce a valve stem which shall be so constructed that it will act as a pressure gauge and which will close an electric circuit when the pressure falls below a predetermined value and this circuit can be connected with a signal of some type, either visible or audible and so located that its operation will be observed by the driver and in this way he will be apprised of the fact that the pressure in one or all of the tires has decreased to such an extent as to make further use inadvisable.

It is a further object of this invention to produce a valve stem that shall be provided with calibrations by means of which the approximate pressure in the tire can be determined by observing the position of the several parts of the valve stem.

In United States Letters Patent No. 1,697,421, granted to me January 1, 1929, an attachment for a valve stem constructed in a different manner, but intended to perform substantially the same functions has been shown and described.

This invention, briefly described, consists of a tubular member having one end provided with a circular flange. The outer surface of this member is threaded and a nut is supplied thereto for clamping the valve onto the inner tube. An elastic tube has one end attached to the circular flange and the other extending into the tubular member. A second tubular member of smaller diameter than the inside of the first member extends into the latter and has its inner end securely connected with the elastic member. An insulating ring is provided near the outer end of the first member and through this ring the second tubular member extends. The ring serves to center the second tubular member and to insulate it from the first. Secured to the smaller tubular member is a contact element that is so positioned that when the pressure falls below a predetermined value, it will come into contact with the outer end of the first tubular member and thereby close an electric circuit which can be used for operating a signal. The outer end of the second tubular member is provided with graduations by means of which the pressure can be determined upon inspection.

Figure 2:
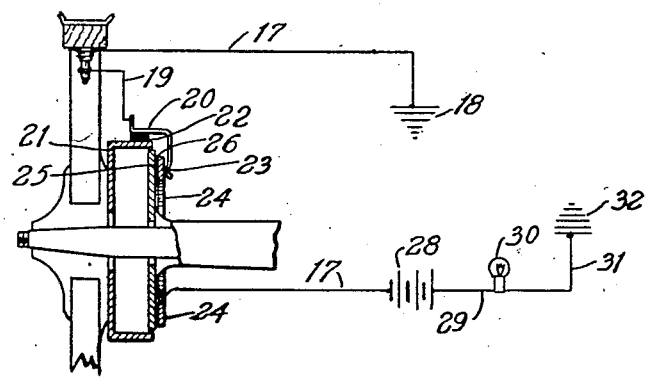

Having thus briefly described the invention, the same will now be described in detail, and for this purpose reference will be had to the accompanying drawing in which the preferred embodiment thereof has been illustrated, and in which:

Fig. 1 is a longitudinal section through the larger of the two tubular members and shows the smaller tubular member in elevation, the elastic tubular connection being shown partly in elevation and partly in section; and Fig. 2 is a sectional view showing one manner of making electrical connection from the rotating wheel to the signal carried by the chassis.

In the drawing reference numeral 1 indicates a tubular member which is provided at one end with a circular flange 2. The upper surface of this flange is preferably corrugated concentrically in the manner indicated. A nut 3 is threadedly connected with the tubular member and serves to clamp the valve assembly to the inner tube 4. An elastic tubular member 5 is attached to the circular flange, preferably by being stretched over the same in the manner shown in Fig. 1. Since the material of which member 5 is made is very elastic, it can readily be applied to the flange in the manner shown. Located within the tube 1 is another tubular member 6 whose outside diameter is materially less than the inside diameter of the tube 1. The lower end of member 6 is inserted into the upper end of member 5 and the latter is securely attached to member 6 by means of cords or wires 7. For the purpose of spacing member 6 from the inside of member 1 and insulating it, a ring-like guide member 8 has been provided. This may be made of hard rubber or a similar substance, and is preferably held in place by an inwardly extending flange 9. The opening in member 8 is slightly larger than the outside diameter of member 6, so that the latter can move freely therein. A spring 10 encircles tubular member 6 and has its ends abutting the upper end of the elastic member 5 and the lower surface of the insulating ring 8. The spring is tensioned so as to produce a force tending to move member 6 downwardly. The outer surface of member 6 is provided with graduations, which have been designated by reference numeral 11. These graduations represent pounds per square inch of pressure in the inner tube. A cap 12 can be applied to the outer end of member 6 if desired. Secured to member 6 is an annular electric contact 13. This contact is held in place by means of a setscrew 14 and can be adjusted so as to come into electrical contact with the upper end of member 1 at any pressure desired. After the pressure within the inner tube has decreased to an amount for which the contact 13 is adjusted, it will engage the end of tube 1 in a manner apparent from the drawing. The inner tube with the attached valve assembly occupies the position relative to the casing 15 and the felloe 16 as indicated by dotted lines in Fig. 1. It is apparent that since the valve stem assembly just described functions as a pressure indicator, the pressure within the inner tube can always be determined by an inspection as the graduations on the member 6 are so positioned as to indicate pressures in pounds per square inch, as above intimated.

It is apparent that unless some signal is provided where it can be heard or seen by the driver, it is quite possible for the pressure to decrease below the danger point without the driver becoming aware of the same. For the purpose of providing such a signal, an electric conductor 17 has been connected with the tubular member 1 and grounded to some part of the automobile frame as indicated by reference numeral 18. Another conductor 19 is connected with the contact element 13 or with the tubular member 6 and extends to a spring wiper contact 20 carried by the brakedrum 21 and insulated from the latter by insulating material 22. The other end of this contact, which has been designated by reference numeral 23, engages the outer surface of a ring 24 that is secured to the outer surface of the radial flange 25 from which it is separated by insulating material 26. A conductor 27 extends from ring 24 to one pole of the battery 28. Another conductor 29 extends from the other pole of the battery to a signal 30, which may be a lamp as shown in the drawing or may be an electric bell. Extending from the signal is another conductor 31 whose end is grounded at 32. Conductors 19 and 27 in Figs. 1 and 2, respectively, represent the electric connector from the switch contact 13 to the battery and if the device is employed in such a place that the sliding connection illustrated in Fig. 2 can be dispensed with, then the conductor 19 can extend directly to the battery as shown in Fig. 1.

It is often necessary to employ air under pressure in other places besides automobile tires and the improved valve stem that has just been described can be attached to any container in a manner analogous to that in which it is connected to the inner tube in Fig. 1. If the pressure falls below a predetermined amount, a signal will operate. It is apparent that such a pressure indicator and low pressure alarm can be serviceable at service stations where air is stored under pressure for inflating tires as well as many other places. When the device is applied to an automobile, a sliding connection of some kind must be employed and as an example of such a connection, the one illustrated in Fig. 2 has been shown. The spring 10 is provided for the purpose of supplementing the action of the rubber tube 5 in resisting the outward movement of the tube 6. It is possible, however, to dispense with the spring 10 and in many cases the elastic action of member 5 is sufficient to make the apparatus function with the desired accuracy. It is, of course, necessary to insulate the tubular member 6 from tubular member 1 and this is accomplished by employing the ring 8 of insulating material to hold the outer end of member 6 in properly spaced relation with tube 1 and the inner end is insulated by the rubber tube 5.

In the drawing a nut 33 has been designated by dotted lines in Fig. 1 and to this nut a dust cap can be secured in the ordinary manner. When a dust cap is used, it must be provided with an opening through which the conductor 19 can pass and has insulating material that prevents the conductor from coming into contact with the cap.

From the above description it will be apparent that by means of the simple construction shown and described an indicating valve stem is produced which will also function as a switch for closing an electric circuit as the pressure diminishes beyond the predetermined value.

The space between the inside of tube 1 and the outside of tube 6 is so large that the coil spring 10 will not contact with tube 1 and since the spring abuts the insulating ring 8, it will be electrically insulated from tube 1.

Having described the invention what is claimed as new is:

1. A pressure indicating valve stem, comprising, in combination, a tube having one end provided with a flange, an elastic tube having one end attached to the flange, a tube located within the first tube, one end of the second mentioned tube being attached to the elastic tube and the other end terminating beyond the first tube, and guide means for holding the second tube centered in the first tube.

2. A pressure indicating valve stem and low pressure signal switch comprising, in combination, a tube having one end provided with a flange, a tube of elastic material having one end attached to the flange with an air tight joint and the other end terminating within the tube, a second tube of an outside diameter smaller than the inside diameter of the first tube located partly within the first tube and attached at one end to the elastic tube, a guide ring of insulating material located in the first tube and through which the second tube extends, and an adjustable contact secured to the second tube and positioned to engage the first tube to close an electric circuit when the pressure falls below a predetermined value.

3. A pressure indicating valve stem and low pressure switch for pneumatic tires comprising, in combination, a tube having one end provided with a flange, the outer surface of the tube being threaded, a nut on the threaded portion, an elastic tube having one end stretched over the flange and folded over the outer edge of the same, the other end of the elastic tube terminating within the first tube, a second tube of smaller diameter having one end within the first tube and attached to the elastic tube, the other end of the second tube terminating outside of the first tube, an insulating guide ring between the adjacent surfaces of the two tubes, and an adjustable contact member carried by the second tube in position to engage the first tube when the pressure decreases below a predetermined value.

4. A pressure indicating valve stem and low pressure switch for pneumatic tires comprising, in combination, a tube having one end provided with a flange, the outer surface of the tube being threaded, a nut on the threaded portion, an elastic tube having one end stretched over the flange and folded over the outer edge of the same, the other end of the elastic tube terminating within the first tube, a second tube of smaller diameter having one end within the first tube and attached to the elastic tube, the other end of the second tube terminating outside of the first tube, an insulating guide ring between the adjacent surfaces of the two tubes, a spring surrounding the second tube in the space between the end of the elastic tube and the guide ring, and an adjustable contact member carried by the second tube in position to engage the first tube when the pressure decreases below a predetermined value.

5. A pressure indicating valve stem and low pressure alarm switch comprising, in combination, a tube having one end provided with a flange, the outer surface of the tube having a threaded section, a nut on the threaded section, an elastic tube having one end stretched over the flange and folded over the other edge of the same, the other end of the elastic tube terminating within the first tube, a second tube slidably mounted in the first tube, the inner end of the second tube being connected with the elastic tube, the other end of the second tube terminating outside of the first tube, a guide means of insulating material in the space between the two tubes, a spring surrounding the inner tube, in the space between the end of the elastic tube and the guide means, said spring being tensioned to move the second tube inwardly into the first tube, and a contact member attached to the second tube and positioned to engage the end of the first tube when the pressure falls below a predetermined value.

CLARENCE A. FRANK.